Patented Jan. 30, 1951

2,540,053

UNITED STATES PATENT OFFICE 2,540,053

HALOGEN SUBSTITUTED GAMMA, GAMMA-DICARBALKOXYBUTYRALDEHYDES AND PROCESS

Owen A. Moe and Donald T. Warner, Minneapolis, Minn., assignors to General Mills, Inc., a corporation of Delaware No Drawing. Application October 28, 1948, Serial No. 57,124

8 Claims. (Cl. 260—483)

1

The present invention relates to the synthesis of halogen substituted butyraldehydes and to the resultant products. These aldehydes are new and novel compounds useful as intermediates in organic syntheses and are particularly useful in the synthesis of amino acids.

The aldehyde compounds contemplated by the present invention may be illustrated by the following formula:

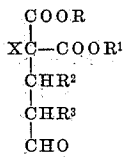

in which R and R¹ are low aliphatic groups containing from one to four carbon atoms, R² and R³ may be selected from the group consisting of hydrogen and methyl, and X is a halogen selected from the group consisting of chlorine and bromine.

It is, therefore, an object of the present invention to provide novel aldehyde compounds which are useful as organic intermediates and particularly for the synthesis of amino acids, these aldehydes having the above formula.

It is a further object of the present invention to provide a novel process for producing these aldehyde compounds.

These aldehyde compounds may be prepared by the 1,4 addition of halogen substituted malonic esters to unsaturated aldehydes such as acrolein, methacrolein, and crotonaldehyde. The reaction may be carried out by preparing a solution of the halogen substituted malonic ester in an alcohol such as methanol, and adding thereto a tertiary amine such as tributylamine. The resultant mixture is then cooled to a low temperature in the neighborhood of 0° C., at which time the unsaturated aldehyde may be added slowly over a period of time. The slow addition of the unsaturated aldehyde serves to maintain the temperature of the reaction mixture in the vicinity of the starting temperature. The reaction is usually complete after a very short period of time such as one to four hours, but it is preferred on occasion to allow the reaction mixture to stand overnight in order to insure completion of the reaction. After the completion of the reaction, the reaction mixture may be acidified slightly with a mild acid, such as glacial acetic acid. The reaction mixture is then concentrated to yield a syrup, which may

2 then be worked up to recover the aldehyde in the manner set forth in the specific examples.

The reaction may be carried out with acrolein, methacrolein, or crotonaldehyde, depending upon the structure of the particular aldehyde desired. The halogen substituent on the malonate may be either bromine or chlorine, but it is preferred to use the chlorine derivative in view of the reduced cost of such compound on a commercial scale as compared with the bromo derivative. In view of the ready availability of malonic ester in the form of ethyl malonate, this ester is preferred. It will be appreciated, however, that other esters such as the methyl, propyl, or butyl esters may be used. Similarly, other solvents than ethanol may be employed, such as benzene, ether, and dioxane. Likewise, the alkaline catalyst may be any tertiary amine such as tributyl amine, benzyl trimethyl ammonium hydroxide, and the like.

The following examples will serve to illustrate the invention:

Example 1

43.2 g. of ethyl bromomalonate were dissolved in 220 cc. of absolute ethanol. The resulting alcoholic solution was cooled to 2° C. Approximately 0.5 g. of tributylamine was added as the catalyst. The addition of 10.5 g. of acrolein was accomplished over a 15 minute period. No appreciable increase in the temperature was observed. After 90 minutes the reaction mixture was slightly alkaline. However, 0.15 g. of tributylamine was added. The resulting reaction mixture was placed in the refrigerator overnight. After standing overnight the reaction mixture was acidic to litmus and 5 cc. of glacial acetic acid was added. The reaction mixture was filtered and the filtrate was concentrated in vacuo to yield a brown syrup. 100 cc. of benzene were added and the concentration in vacuo was repeated. Finally, the residual product was dissolved in 200 cc. of benzene and the benzene solution was washed four times with 60 cc. portions of water. After drying over anhydrous sodium sulfate, the benzene was removed by distillation in vacuo. 40.4 g. of a light yellow oil resulted. The resulting oil was subjected to distillation under diminished pressure and the desired product was collected at 97–100° C. at 0.12 mm. ($n_D^{25}$ 1.4665). A portion of the desired product was treated with 2,4-dinitrophenylhydrazine in the usual manner. The resulting 2,4-dinitrophenylhydrazone was obtained as light yellow platelets melting at 81–82.5° C. The 2,4- dinitrophenylhydrazone was purified by recrystallization from absolute ethanol yielding gleaming orange platelets melting at 82.5–83.5° C. The purified 2,4-dinitrophenylhydrazone was analyzed. *Analysis.*—Calculated for: C, 40.42; H, 4.02; N, 11.79; Br, 16.82. Found: C, 40.82; H, 4.16; N, 11.75; Br, 16.82.

*Example 2*

47.8 g. of ethyl bromomalonate were dissolved in 100 cc. of ethanol. The resulting alcoholic solution was mixed with 0.44 g. of 40% benzyl trimethyl ammonium hydroxide solution. The addition of 14.7 cc. of acrolein was accomplished during a 15 minute period. No appreciable increase in the temperature of the reaction mixture was noted. After the addition of the alpha, beta-unsaturated aldehyde the reaction was acid to litmus. Hence, 1.2 g. of benzyl trimethyl ammonium hydroxide were added together with a small quantity of tributylamine. The reaction mixture was permitted to stand overnight. The reaction mixture was then concentrated in vacuo and the residual material was dissolved in 200 cc. of benzene. The benzene solution was extracted with three 50 cc. portions of water. After drying over anhydrous sodium sulfate the benzene was removed by concentration in vacuo and the residual oil was distilled under diminished pressure as previously described. A portion of the desired product was treated in the usual manner with 2,4-dinitrophenylhydrazine and the precipitated 2,4-dinitrophenylhydrazone thus obtained melted at 79–81° C. Elementary analysis showed the presence of bromine.

*Example 3*

Ethyl chloromalonate (19.5 g.) was dissolved in 100 cc. of absolute ethanol. Tributylamine (0.3 cc.) was added and 5.6 g. of acrolein was added dropwise as the temperature of the reaction mixture increased from 27° to 34° C. After the addition of the acrolein was complete, the reaction mixture was stirred at room temperature for a five hour period. The catalyst was neutralized by the addition of the requisite quantity of glacial acetic acid. A 10 cc. portion of the neutralized reaction mixture was mixed with 2,4-dinitrophenylhydrazine in the conventional manner. A yellow crystalline 2,4-dinitrophenylhydrazone was obtained and the crude product melted at 99–101° C. An analytical sample (M. P. 105–106° C.) of the 2,4-dinitrophenylhydrazone was prepared by three crystallizations from ethanol. The remainder of the above reaction mixture was concentrated in vacuo and the gamma-chloro-gamma,gamma-dicarbethoxy butyraldehyde was obtained as a nearly colorless oil. Additional quantities of the 2,4-dinitrophenylhydrazone were prepared from this oil. Anal.—Calcd. for $C_{16}H_{19}O_8N_4Cl$: C, 44.6; H, 4.41; N, 13.00. Found: C, 44.72; H, 4.55; N, 13.28.

*Example 4*

Ethyl chloromalonate (19.5 g.) was dissolved in 100 cc. of absolute ethanol and 0.5 cc. of tributylamine was added. Redistilled crotonaldehyde (7.4 g.) was added dropwise. No increase in the reaction temperature was noted and the reaction mixture was acidic to litmus. After the addition of the aldehyde was complete, the reaction mixture was stirred at room temperature for a two-hour period and then heated to 45–50° C. for a ten-minute period. After standing at room temperature overnight, the catalyst was neutralized with glacial acetic acid. The solvent was removed by distillation in vacuo and the residual oil was dissolved in 125 cc. benzene. After washing with three 100 cc. portions of water, the benzene solution was dried over anhydrous sodium sulfate. The benzene was removed by distillation and the residual oil was distilled under diminished pressure. The desired fraction was collected at 90–93° C. at 0.17 mm. $n_D^{25}$ 1.4452. When a portion of this product was mixed with 2,4-dinitrophenylhydrazine in the conventional manner, a copious quantity of a crystalline 2,4-dinitrophenylhydrazone was obtained. The crude product melted at 117–127° C. and after two crystallizations from ethanol it melted at 138–139° C. Anal.—Calcd. for $C_{17}H_{21}O_8N_4Cl$: C, 45.89; H, 4.72; N, 12.59. Found: C, 45.82; H, 4.94; N, 12.85.

The compounds obtained according to the present invention are extremely useful in further syntheses. Thus the compounds possess numerous functional groups which are capable of entering into typical organic reactions. These groups include the esterified carboxyl groups, the aldehyde group, and the halogen group. Typical of the reactions which these compounds are capable of entering are the reactions for the production of amino acids as set forth in our copending application, Serial No. 648,020, filed February 15, 1946, now abandoned, entitled Aldehydo Compounds and Processes of Producing the Same. The general mechanism of the reaction is the same as the reactions set forth therein, with the exception that by employing the present compounds the halogen is present throughout the sequence of the reactions and is replaced by an amino group by simple ammonolysis after the desired compound has been produced. An example of this type of reaction is the following reaction showing the production of alpha-halogen pimelic acid:

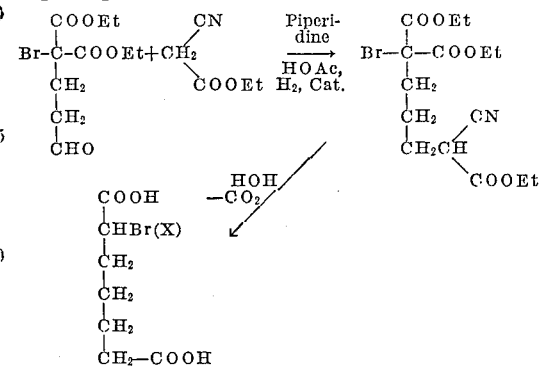

The alpha-halogen pimelic acid may be converted to the alpha-amino pimelic acid by ammonolysis.

While various modifications of the invention have been described, it is to be understood that other variations are possible within the scope of the invention without departing from the spirit thereof.

We claim as our invention:

1. Aldehyde compounds having the following formula:

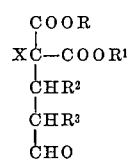

in which R and $R^1$ are lower alkyl groups containing from one to four carbon atoms, $R^2$ and $R^3$ are selected from the group consisting of hydrogen and methyl and $R^2$ and $R^3$ are not both methyl, and X is selected from the group consisting of chlorine and bromine.

2. Gamma, gamma-dicarbethoxy-gamma-chlorobutyraldehyde.

3. Gamma, gamma-dicarbethoxy-gamma-bromobutyraldehyde.

4. Gamma, gamma-dicarbethoxy-gamma-chloro-beta-methylbutyraldehyde.

5. Process of producing compounds having the following formula:

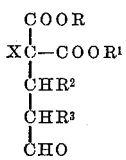

in which R and $R^1$ are lower alkyl groups containing from one to four carbon atoms, $R^2$ and $R^3$ are selected from the group consisting of hydrogen and methyl and $R^2$ and $R^3$ are not both methyl, and X is a halogen selected from the group consisting of chlorine and bromine, which comprises reacting a halogen substituted malonic ester having the formula

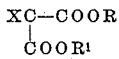

with an unsaturated aldehyde having the formula

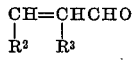

in the presence of a tertiary amine catalyst.

6. Process of producing gamma, gamma-dicarbethoxy-gamma-chlorobutyraldehyde which comprises preparing a solution of ethyl chloromalonate in absolute ethanol, adding a tertiary amine thereto, and then adding acrolein to the resultant solution slowly and with agitation, and allowing the reaction to proceed to substantial completion.

7. Process of producing gamma, gamma-dicarbethoxy-gamma-chlorobutyraldehyde which comprises dissolving ethyl chloromalonate in absolute ethanol, adding tributyl amine thereto in a fractional mole amount based on the ethyl chloromalonate, adding acrolein gradually to the resultant mixture, and maintaining the temperature of the reaction mixture below about 20° C., agitating the mixture during the addition of the acrolein and after the addition is complete for a sufficient period of time to permit the reaction to go to substantial completiion.

8. Process of producing gamma, gamma-dicarbethoxy-gamma-bromobutyraldehyde which comprise preparing a solution of ethyl bromomalonate in absolute ethanol, adding tributyl amine thereto in a fractional mole amount based on the ethyl bromomalonate, adding acrolein to the resultant solution at a temperature below 20° C., the acrolein being added gradually and while the reaction mixture is being thoroughly agitated and continuing the reaction until it has gone to substantial completion.

OWEN A. MOE.
DONALD T. WARNER.

No references cited.